US008442484B2

(12) United States Patent
Rubin et al.

(10) Patent No.: US 8,442,484 B2
(45) Date of Patent: May 14, 2013

(54) MOBILE DEVICE-BASED BANDWIDTH THROTTLING

(75) Inventors: Andrew E. Rubin, Portola Valley, CA (US); Robert J. Greenwalt, Woodside, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/613,645

(22) Filed: Sep. 13, 2012

(65) Prior Publication Data

US 2013/0012160 A1    Jan. 10, 2013

Related U.S. Application Data

(60) Division of application No. 13/490,761, filed on Jun. 7, 2012, which is a continuation of application No. 13/283,159, filed on Oct. 27, 2011, now Pat. No. 8,285,250.

(60) Provisional application No. 61/408,898, filed on Nov. 1, 2010.

(51) Int. Cl.
*H04M 11/00* (2006.01)

(52) U.S. Cl.
USPC ........... 455/405; 455/406; 455/407; 455/408; 455/423; 455/424

(58) Field of Classification Search .......... 455/405–408, 455/412.2, 414.2, 423–425
See application file for complete search history.

(56) References Cited

U.S. PATENT DOCUMENTS

| 7,085,289 | B2 | 8/2006 | Cromer et al. |
|---|---|---|---|
| 7,873,074 | B1 | 1/2011 | Boland |
| 2007/0161411 | A1 | 7/2007 | Liao et al. |
| 2007/0208826 | A1 | 9/2007 | Devolites |
| 2007/0254628 | A1 | 11/2007 | Rybak |
| 2009/0054030 | A1 | 2/2009 | Golds |
| 2010/0188975 | A1 | 7/2010 | Raleigh |
| 2010/0192212 | A1* | 7/2010 | Raleigh .............. 726/7 |

OTHER PUBLICATIONS

Authorized Officer B. Copenheaver. International Search Report and Written Opinion in international application No. PCT/US2011/058049, dated Jan. 30, 2012, 11 pages.
'senk9@wp' [online]. "Android App of the Day—3G Watchdog/APNDroid (and How to Set Limits)," 2010, [retrieved on Feb. 7, 2012]. Retrieved from the Internet: URL:< http://senk9.wordpress.com/2010/05/15/android-app-of-the-day-3g-watchdog-apndroid-and-how-to-set-limits/>. 4 pages.

* cited by examiner

*Primary Examiner* — Wayne Cai
(74) *Attorney, Agent, or Firm* — Fish & Richardson P.C.

(57) ABSTRACT

Methods, systems, and apparatus, including computer programs encoded on a computer storage medium, for implementing mobile device-based bandwidth throttling. In one aspect, a method includes receiving policy from a wireless carrier that specifies one or more data usage thresholds allotted by the wireless carrier for data transferred over a wireless carrier network during a predetermined period of time, determining an amount of data that has been transferred by the mobile device over the wireless carrier network during the predetermined period of time, determining that the amount exceeds one or more of the data usage thresholds, and throttling the bandwidth of a mobile device over the wireless carrier network based on determining that the amount exceeds one or more of the data usage thresholds.

20 Claims, 5 Drawing Sheets

FIG. 3

300a — WIRELESS & NETWORK SETTINGS  302

- Wi-Fi — CONNECTED TO GOOGLEGUEST
- Wi-Fi SETTINGS — SET UP & MANAGE WIRELESS ACCESS POINTS
- BLUETOOTH
- BLUETOOTH SETTINGS — MANAGE CONNECTIONS, SET DEVICE NAME & DISCOVERABILITY
- TETHERING — SET UP & MANAGE TETHERING
- VPN SETTINGS — SET UP & MANAGE VIRTUAL PRIVATE NETWORKS (VPNs)
- MOBILE NETWORKS — SET OPTIONS FOR ROAMING, NETWORKS, APNs  304

300b — MOBILE NETWORK SETTINGS  306

- DATA ENABLED — ENABLE DATA ACCESS OVER MOBILE NETWORK
- DATA ROAMING — CONNECTED TO DATA SERVICES WHEN ROAMING
- DATA USAGE POLICY — 200GB OF A MAXIMUM OF 225GB (89%) NEXT PERIOD RESET 4/17/2011  308
- ACCESS POINT NAMES
- USE ONLY 2G NETWORKS — SAVES BATTERY
- NETWORK OPERATORS — SELECT A NETWORK OPERATOR

300c — DATA USAGE POLICIES  310

- CURRENT DATA USAGE — 200GB OF A MAXIMUM OF 225GB (89%)  312
- TIME FRAME — 50% THROUGH OF CYCLE ELAPSED (COUNTERS WILL BE RESET IN 15 DAYS (4/17/2011)  314
- DATA RATE POLICY — DATA RATE WILL BE 300 KB/sec WHEN DATA LIMIT IS EXCEEDED  316
- LEARN MORE — MORE INFORMATION ABOUT YOUR DEVICE'S DATA POLICY  318

MOBILE DEVICE-BASED BANDWIDTH THROTTLING

CROSS-REFERENCE TO RELATED APPLICATION

This application is a divisional of U.S. patent application Ser. No. 13/490,761, filed on Jun. 7, 2012, which is a continuation of U.S. patent application Ser. No. 13/283,159, filed on Oct. 27, 2011, which claims the benefit U.S. Provisional Patent Application No. 61/408,898, filed Nov. 1, 2010, all of which are incorporated herein by reference.

FIELD

The present disclosure relates to bandwidth throttling.

BACKGROUND

"Bandwidth" refers to a measure of the bit rate of data communication resources, expressed in a number bits communicated per unit time. "Bandwidth throttling" may be used to reduce the speed at which data is communicated, for example to limit network congestion or to help prevent a web server from crashing.

A server administrator may set a bandwidth throttling parameter to limit the number of requests that the server responds to within a specified period of time. For example, the server may be configured to implement bandwidth throttling during periods of peak server use, to prevent the server from crashing while attempting to respond to a large number of data requests. When the bandwidth throttling parameter is exceeded, the server may queue additional data requests, or may delay processing the additional requests until bandwidth use reaches an acceptable level.

SUMMARY

In general, one aspect of the subject matter described in this specification may be embodied in methods that include the actions of implementing bandwidth throttling by a mobile device based on information that is provided by a wireless carrier. In one aspect, the wireless carrier provides a policy that specifies certain data usage limits, and bandwidth throttling parameters associated with those limits. When the mobile device determines that a particular data usage limit has been exceeded, the mobile device applies the bandwidth throttling parameter associated with the exceeded limit to perform operations to slow the transmission of data to and/or from the mobile device.

In doing so, the burden of performing bandwidth throttling, i.e., in performing the appropriate calculations and in carrying out the operations used to reduce the flow of data communicated to and/or from the mobile device, is distributed to the mobile device itself. As such, the wireless carrier may arrange its resources to focus on improving the flow of data, without implementing internal processes that purposefully restrict the flow of data under certain circumstances. Furthermore, the wireless carrier may limit traffic without actively managing or implementing the actual bandwidth throttling. By alleviating the burden of bandwidth throttling from the wireless carrier, mobile device manufacturers may manufacturer and offer mobile devices that are more adaptable and pleasing to the wireless carrier.

In general, another aspect of the subject matter described in this specification may be embodied in methods that include the actions of receiving policy from a wireless carrier that specifies one or more data usage thresholds allotted by the wireless carrier for data transferred over a wireless carrier network during a predetermined period of time, and determining an amount of data that has been transferred by the mobile device over the wireless carrier network during the predetermined period of time. The method also includes determining that the amount exceeds one or more of the data usage thresholds, and throttling the bandwidth of a mobile device over the wireless carrier network based on determining that the amount exceeds one or more of the data usage thresholds.

Other embodiments of these aspects include corresponding systems, apparatus, and computer programs, configured to perform the actions of the methods, encoded on computer storage devices.

These and other embodiments may each optionally include one or more of the following features. For instance, the method includes displaying, by the mobile device, representations of the one or more data usage thresholds and the amount; the method includes determining, by the mobile device, that the amount is within a predetermined range of one or more of the data usage thresholds, and displaying, by the mobile device, a warning based on determining that the amount is within the predetermined range; the method includes determining, by the mobile device, that the amount is trending to exceed one or more of the data usage thresholds within the predetermined period of time, and displaying, by the mobile device, a warning based on determining that the amount is trending to exceed the one or more data usage thresholds; the method includes determining, by the mobile device, a first value representing a percentage of one or more of the data usage thresholds that has been used by the mobile device during the predetermined period of time, determining, by the mobile device, a second value representing a percentage of the predetermined period of time that has elapsed, determining, by the mobile device, that the first value is outside of a predetermined range from the second value, and displaying, by the mobile device, a warning based on determining that the first value is outside of a predetermined range from the second value; the method includes determining that the first value exceeds a predetermined third value, where the warning is only displayed after determining that the first value is outside of the predetermined range from the second value, and that the first value exceeds the predetermined third value; the method includes determining, by the mobile device, that the predetermined period of time has elapsed, and unthrottling, by the mobile device, the bandwidth of the mobile device over the wireless carrier network; the policy is a Fair Access Policy for the wireless carrier, and one or more of the data usage thresholds is a bandwidth cap; the method includes receiving, by the mobile device, an updated policy from the wireless carrier that specifies one or more increased data usage thresholds allotted by the wireless carrier for data transferred over the wireless carrier network during the predetermined time, determining, by the mobile device, that the amount does not exceed one or more of the increased data usage thresholds, and unthrottling, by the mobile device, the bandwidth of the mobile device over the wireless carrier network based on determining that the amount does not exceed one or more of the increased data usage thresholds; the method includes displaying, by the mobile device, a control that allows a user of the mobile device to purchase the updated policy, and determining, by the mobile device, that the user has selected the control, wherein the updated policy is received based on determining that the user has selected the control; the method includes detecting that the mobile device has been booted, that a subscriber identity module (SIM) card associated with the mobile device has been changed, or that a second, different predetermined period of time has elapsed, where the amount is determined based on detecting that the mobile device has been booted, that the SIM card associated with the mobile device has been changed, or that the second predetermined period of time has elapsed; determining the amount further determining a first amount representing an amount of data that has been used by the mobile device during the predetermined period of time while the mobile device is roaming, determining a second amount representing an amount of data that has been used by the mobile device during the predetermined period of time while the mobile device is not roaming, and establishing the second amount as the amount; determining the amount further includes determining a first amount representing an amount of data that has been communicated by the mobile device through a wide-area network connection during the predetermined period of time, determining a second amount representing an amount of data that has been communicated by the mobile device through a local area network data connection during the predetermined period of time, and establishing the first amount as the amount; throttling the bandwidth includes delaying the transmission of data from the mobile device; the data usage thresholds include a first data usage threshold and a second data usage threshold, and throttling the bandwidth includes throttling the bandwidth to a first extent based on determining that the amount exceeds the first data usage threshold, and throttling the bandwidth to a second, different extent based on determining that the amount exceeds the second data usage threshold; and/or the bandwidth of the mobile device over the wireless carrier network is throttled to a non-zero rate of data transfer.

The details of one or more implementations are set forth in the accompanying drawings and the description below. Other potential features and advantages will become apparent from the description, the drawings, and the claims.

BRIEF DESCRIPTION OF THE DRAWINGS

FIGS. 3, 4A-B, and 5A-B show example user interfaces for illustrating mobile device data usage.

Like reference numbers and designations in the various drawings indicate like elements.

DETAILED DESCRIPTION

Figure 1:
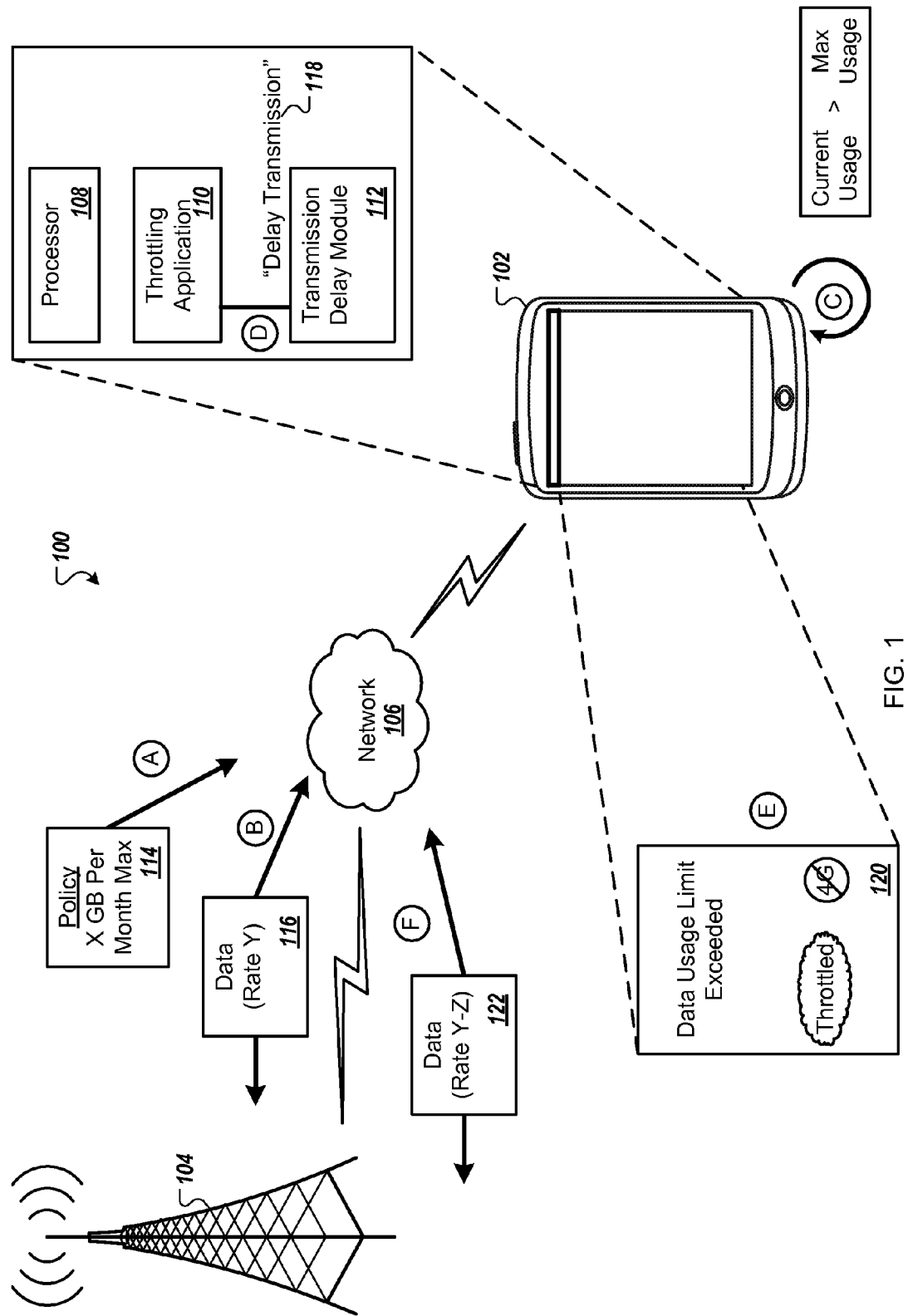
FIG. 1 is a diagram of an example system that may perform mobile device based bandwidth throttling.

FIG. 1 is a diagram of an example system 100 that may perform mobile device-based bandwidth throttling. FIG. 1 also illustrates a flow of data, shown in states (A) to (F), as well as a user interface 120 that may be shown on a mobile device 102 during states (E) and (F). States (A) to (F) may occur in the illustrated sequence, or they may occur in a sequence that is different than the illustrated sequence.

Briefly, the mobile device 102 receives a policy from a wireless carrier 104, where the policy includes data that specifies one or more data usage thresholds allotted by the wireless carrier 104 for a predetermined period of time (e.g., a week, a day, or a billing period). As used herein, a data usage threshold refers to an amount of data (e.g., in megabits or gigabits, or in a quantity of a certain type of data such as songs, videos, movies, images, or other files) that the mobile device 102 may send to and/or receive from the wireless carrier 104. In general, data usage thresholds may be specified by the wireless carrier 104 or some other entity, such as an agent of the wireless carrier, the user, or the manufacturer or the mobile device 102.

The mobile device 102 monitors the amount of data received by and/or sent from the mobile device 102 to determine a current amount of data used by the mobile device 102 during the predetermined period of time. If the mobile device 102 determines that the current amount of data used exceeds one or more of the data usage thresholds, the mobile device 102 throttles the bandwidth available to the mobile device 102 (e.g., to a non-zero rate of data transfer) based on the limits specified in the received policy.

In some implementations, the mobile device 102 displays a notification to a user of the mobile device 102 when the mobile device 102 determines that the current data usage is trending to exceed one of the data usage thresholds and/or when one or more of the data usage thresholds have been exceeded. In throttling the bandwidth of the mobile device 102 and in providing the notification, the system 100 alerts the user of the mobile device 102 that they are being penalized for transferring an excess amount of data.

To the user's advantage, such an approach may allow a user to determine that another user of the mobile device 102 is transferring an excess amount of data, or that the user has purchased a data plan through the wireless carrier 104 that is insufficient for the user's needs. In the situation where the mobile device 102 itself acts as a mobile hotspot, this approach may also allow a user to determine that other devices that are transferring data through the mobile device 102 are transferring an excess amount of data.

In greater detail, the mobile device 102 connects to the wireless carrier 104 using a network 106. The wireless carrier 104 allows the mobile device 102 to access data, such as a web page, an application store, streaming media, or other data, and to send data, such as data requests, online posts, file uploads, notes, text or instant messages, or other data.

The mobile device 102 may be a mobile phone, a tablet computer, a music player, an e-book reader, a laptop or desktop computer, PDA, smart phone, or other handheld or mobile device that includes one or more processors 108. For example, the mobile device 102 may be a desktop computer equipped with a Universal Serial Bus (USB) modem that provides access to a wireless wide area network 106 operated by the wireless carrier 104. The network 106 may include a wireless cellular network, a wireless local area network (WLAN) or Wi-Fi™ network, a Third Generation (3G) or Fourth Generation (4G) mobile telecommunications network, a local area network, the Internet, or any appropriate combination thereof.

The mobile device 102 includes a throttling application 110 that determines if the mobile device 102 has exceeded one or more data usage thresholds that have been allotted or specified by the wireless carrier 104 for the predetermined period of time. The throttling application 110 monitors the current data usage (e.g., total amount of data communicated, total amount of data uploaded, or total amount of data downloaded) of the mobile device 102 for the predetermined period of time, and compares the current data usage to one or more data usage thresholds specified in a policy received from the wireless carrier 104.

If the throttling application 110 determines that one or more of the data usage thresholds specified in the policy has been exceeded, the throttling application 110 triggers action, such as action by a transmission delay module 112 in the mobile device 102. The action may informative, such as by visually letting the user know that a data usage threshold has been or will be exceed. Additionally, the action may be experiential, such as by throttling the bandwidth of the mobile device 102 to an extent that communication delays are perceivable to the user, as a way of notifying the user that the data usage may be out of line with an agreed amount or norm.

In one example implementation, the transmission delay module 112 is included as part of the transmitter of the mobile device 102. The transmitter allows the mobile device 102 to communicate with the wireless carrier 104 via the network 106. For example, the transmitter is an antenna or a software module controlling the available bandwidth of an antenna in the mobile device 102. The policy received from the wireless carrier 104 may specify the extent that bandwidth should be throttled for each data usage threshold, and the throttling application 110 may provide the information specifying the bandwidth throttling extent to the transmitter.

When triggered, the transmission delay module 112 limits the maximum bandwidth available to the mobile device 102 for the duration of the predetermined period of time. For example, the transmission delay module 112 may reduce the bandwidth from 1 Gbit/second to 100 Mbits/second until the billing period has ended, or until the user purchases an upgrade data plan and a new policy is received at the mobile device 102.

During state (A), the mobile device 102 receives a policy 114 from the wireless carrier 104 that specifies one or more data usage thresholds allotted by the wireless carrier 104 for a predetermined period of time. For example, when the mobile device 102 is initially provisioned, or when the mobile device 102 is powered on, the mobile device 102 requests the policy 114 from the wireless carrier 104. The policy 114 may be included in a file, such as a HyperText Markup Language (HTML) or eXtensible Markup Language (XML) file.

The policy 114 may specify thresholds that apply per mobile device application, or that apply for any or all usage of the mobile device 102. If a threshold has been specified for a mobile device application, the mobile device application or applications to which the threshold applies can be determined by the wireless carrier, by the original equipment manufacturer (OEM) of the mobile device 102, by the provider of the operating system of the mobile device 102, or by other parties.

The policy 114 may specify that, when the data usage exceeds 125 GB, the available bandwidth should be reduced to fifty percent of the maximum available bandwidth, and when the data usage exceeds 225 GB, the available bandwidth should be reduced to twenty-five percent of the maximum available bandwidth. Instead of specifying the throttling extent as a percentage, the policy 114 may specify a maximum transfer rate available to the mobile device for each data usage threshold. In some implementations, the policy may only specify one data usage threshold.

The policy 114 received by the mobile device 102 may be a read only policy, for example to prevent a user of the mobile device 102 from editing the policy 114. In some implementations, a user may view information from the policy 114. For example, a user interface on the mobile device 102 may display information about the policy 114, such as the beginning and end dates associated with a particular predetermined period of time, the one or more data usage thresholds and associated bandwidth throttling amounts, and current data usage amounts.

During state (B), the mobile device 102 sends and/or receives data 116 at a data bandwidth rate Y. For example, the mobile device 102 requests one or more web pages and streaming audio and video, and the wireless carrier 104 provides the requested data.

Periodically, the throttling application 110 determines a current amount of data that has actually been transferred to and/or from the mobile device 102 during the predetermined period of time. For example, the throttling application 110 combines the amount of data received by the mobile device 102 (e.g., the arrow pointing to the right of the data 116) with the amount of data sent by the mobile device 102 (e.g., the arrow pointing to the left of the data 116), and adds that amount to an accumulated amount of data that has been transferred to and/or from the mobile device 102 since the period of time began, to determine the current amount of data used by the mobile device 102 for the predetermined period of time. For example, the throttling application 110 determines that the current amount of data used by the mobile device 102 is 200 GB.

During state (C), the throttling application 110 compares the current amount of data that has actually been transferred to and/or from the mobile device 102 during the predetermined period of time with the data usage thresholds. For example, the throttling application 110 compares the current amount of data (e.g., 200 GB) with the data usage threshold of 125 GB and the data usage threshold of 225 GB.

During state (D), the throttling application 110 determines that the current amount of data exceeds one or more of the data usage thresholds. For example, the throttling application 110 determines that the current amount of data usage of 200 GB is greater than the data usage threshold of 125 GB but is not greater than the data usage threshold of 225 GB. If the current amount of data does not exceed a data usage threshold, the throttling application 110 waits until a predetermined amount of time elapses, and then reevaluates whether the current amount of data exceeds one or more of the data usage thresholds at the later time.

Based on the determination that a data usage threshold is exceeded, the throttling application 110 sends a delay transmission notification 118 to the transmission delay module 112 which instructs the transmitter to reduce the bandwidth available to the mobile device 102 by a rate of Z. For example, the transmission delay module may disable fourth generation (4G) services of the mobile device 102 and use third generation (3G) services to send and receive data. By using 3G services the mobile device 102 has less bandwidth available for data transfer than would otherwise be available with 4G services.

Alternatively, the transmission delay module 112 may cause packets of data that are to be transmitted, or packets of data that have been received, to be stored for a short period of time in a buffer before they are further processed. When such delay becomes perceptible to a user of the mobile device 102, the user may be inconvenienced and made aware that their data usage exceeds a certain norm, and that they should limit their data usage or take some action to unthrottle the bandwidth of the mobile device, such as by purchasing an upgraded data plan.

During state (E), the mobile device 102 optionally displays a threshold exceeded message 120 in a user interface. The threshold exceeded message 120 includes text indicating that the mobile device 102 exceeded one of the data usage thresholds, that bandwidth is being throttled, and the current bandwidth available to the mobile device 102. For example, the threshold exceeded message 120 indicates that the mobile device 102 is no longer using 4G mobile device services for transmitting data to and from the mobile device 102. In some implementations, the threshold exceeded message 120 specifies the throttled bandwidth available to the mobile device 102 for the duration of the predetermined period of time, as described with more detail below in reference to FIG. 3.

During state (F), the bandwidth of the mobile device 102 is throttled based on the limitations specified for the exceeded data usage threshold. For example, the mobile device 102 sends and receives data 122 from the wireless carrier 104 using an updated bandwidth rate of Y-Z.

The throttling of bandwidth may include delaying the transmission of data to and from the mobile device 102. For example, the transmission of data may be delayed by a millisecond, until the data may be transferred according to the updated bandwidth rate of Y-Z, or by some other amount of time. The transmission delay module 112 actively throttles the bandwidth of the device by slowing down the sending and receipt of data, for example by changing the behavior of the operating system kernel on the mobile device 102. In one example implementation, the transmission delay module 112 alters a parameter of a driver, such as a WiFi driver or a transmitter driver, to slow the communication of data between the mobile device 102 and the wireless carrier 104.

When the mobile device 102 (e.g., the throttling application 110) determines that the predefined period of time has elapsed, or that a new data usage limit has been specified, the transmission delay module 112 unthrottles the bandwidth of the mobile device. For example, when the new billing cycle begins, when an emergency condition is detected, or when the user of the mobile device 102 pays for upgraded data service, the transmission delay module 112 allows use of 4G capabilities for sending and receiving data at the bandwidth rate Y, as described with reference to state (B).

In some implementations, the mobile device 102 receives a new policy periodically, such as once a billing cycle, a week, or every day. In some implementations, the mobile device 102 receives a new policy when the predetermined period of time ends or begins. In some implementations, the mobile device 102 receives a new policy when the phone is initially turned on, provisioned, or when a SIM card is added or changed.

In some implementations, the policy 114 is a Fair Access Policy for the wireless carrier and one or more of the data usage thresholds include a bandwidth cap. For example, the Fair Access Policy implements a bandwidth cap on data sent over the network 106 (e.g., a wide-area network) when the network 106 is shared by multiple mobile devices in order to ensure that a small percentage of the mobile devices do not use the majority of the bandwidth available on the network 106.

In other implementations, the throttling application 110 determines a first amount representing an amount of data that has actually been communicated by the mobile device 102 through a wide-area network connection (e.g., a wireless cellular network of the wireless carrier 104) and a second amount representing an amount of data that has actually been communicated by the mobile device 102 through a local area network data connection (e.g., a Wi-Fi™ network) during the predetermined period of time, and uses the first amount as the current amount of data.

For example, the throttling application 110 determines that 65 GB of data has been sent and received over a wide-area network and 135 GB of data has been sent and received by the mobile device 102 over one or more local area networks. The throttling application 110 then determines that the data threshold of 125 GB has not been exceeded because the current data usage is only 65 GB.

In some implementations, the throttling application 110 may count some but not all data that is communicated to and/or from the mobile device 102 when determining the total amount of data usage. For example, in determining the amount of data that has been sent and/or received, the throttling application 110 may ignore the amount of data that has been sent and/or received over a certain type of connection, such as through a WiFi connection. In other implementations, the throttling application 110 may ignore the amount of data that has been communicated to and/or from the mobile device 102 while the mobile device 102 is roaming.

In some implementations, when the throttling application 110 determines that one of the data usage thresholds is exceeded, the throttling application 110 does not compare the current amount of data with any remaining data usage thresholds that were not already compared with the current amount of data. For example, the throttling application 110 may rank the data usage thresholds from the highest threshold (e.g., 500 GB) to the lowest threshold (e.g., 125 GB), and compare the data usage thresholds with the current amount of data. When the throttling application 110 identifies the first data usage threshold that the current amount of data exceeds, the transmitter 112 reduces the bandwidth available to the mobile device according to a transfer rate Z specified in the policy 114 and associated with the exceeded data usage threshold.

Figure 2:
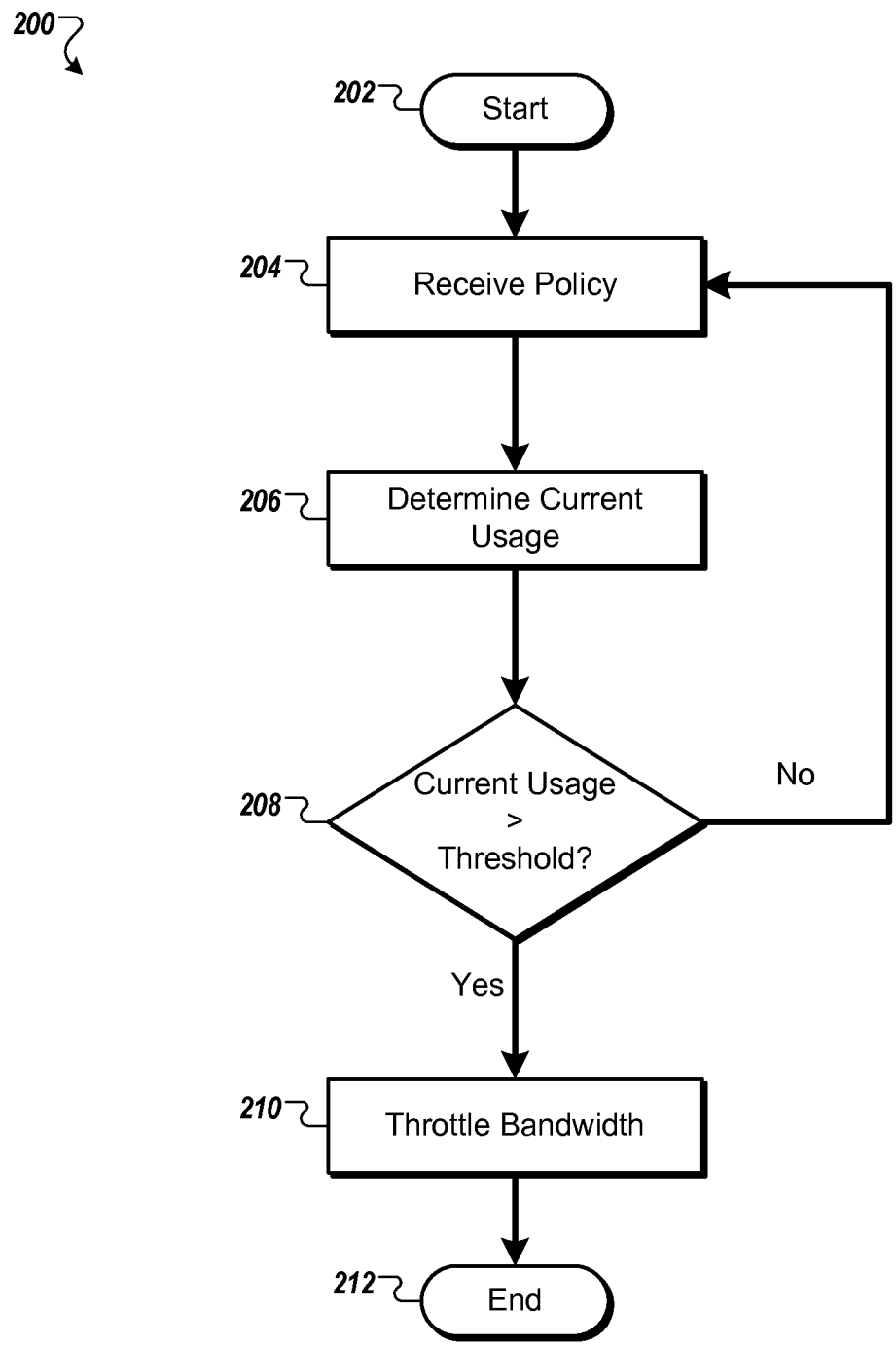
FIG. 2 is a flow chart illustrating an example process for performing mobile device based bandwidth throttling according to a policy.

FIG. 2 is a flow chart illustrating an example process 200 for performing mobile device based bandwidth throttling according to a policy. Briefly, the process 200 includes a mobile device receiving a policy from a wireless carrier, determining the current amount of data used during a predetermined period of time, and throttling the bandwidth of the mobile device if the current amount of data is greater than one or more data usage thresholds specified in the policy.

In general, process 200 implements bandwidth throttling by a mobile device based on information that is provided by a wireless carrier. In doing so, the burden of performing bandwidth throttling, i.e., in performing the appropriate calculations and in carrying out the processes used to reduce the flow of data communicated to and from the device, is distributed to the mobile device itself. As such, the wireless carrier may arrange its resources to focus on improving the flow of data, without implementing internal processes that purposefully restrict the flow of data under certain circumstances.

In more detail, when the process 200 begins (202), the mobile device receives a policy from a wireless carrier (204). The policy specified one or more data usage thresholds allotted by the wireless carrier for a predetermined period of time. For example, the mobile device receives the policy from the wireless carrier that provides the mobile device with service and the policy includes a data usage threshold of 225 GB per billing cycle.

The mobile device determines the current usage of data for the predetermined period of time (206). For example, the mobile device determines that the amount of data sent from the mobile device combined with the amount of data received by the mobile device add up to 200 GB of data. In some implementations, the mobile device does not factor in data sent and received from another wireless carrier (e.g., when the mobile device is roaming) in the current amount of data. In some implementations, the mobile device does not factor in data sent and received over a local area network (e.g., a wireless router) in the current amount of data.

The mobile device determines if the current usage is greater than one of the thresholds specified in the policy (208). For example, the mobile device compares the current amount of data to the one or more data usage thresholds specified by the policy.

If the current usage is less than all of the thresholds specified by the policy, the process 200 checks to see if the wireless carrier provided the mobile device with an updated policy (204), i.e., a downgraded or upgraded policy or a newly purchased policy, and determines an updated current usage for the predetermined period of time (206). For example, the mobile device determines that the current usage of 200 GB is less than the threshold of 225 GB and checks to see if the wireless carrier provided the mobile device with an updated policy.

Based on determining that the current usage is greater than one of the thresholds specified in the policy, the mobile device throttles the bandwidth available to the mobile device (210), thereby ending the process 200 (207). The mobile device throttles the bandwidth to a bit rate greater than zero. For example, the mobile device determines that the current usage is greater than the threshold of 225 GB and disables 4G services, allowing the mobile device to send and receive data using available 3G services at a reduced bandwidth.

The process 200 may include resetting the current usage amount and unthrottling the bandwidth available to the mobile device. In some implementations, when the mobile device is rebooted, a subscriber identity module (SIM) card associated with the mobile device is changed, when an emergency condition is detected, or when a second predetermined period of time has elapsed (e.g., the beginning of the next billing cycle), the current amount of data usage is determined based on the identified event change. For example, the mobile device may reset the current amount of data usage to zero when a different SIM card is placed in the mobile device and unthrottle the amount of bandwidth available to the mobile device.

The process 200 may include the mobile device receiving an updated policy from the wireless carrier that specifies one or more increased data usage thresholds allotted by the wireless carrier for the predetermined time. After receiving the updated policy, the mobile device may determine that the current amount does not exceed one or more of the increased data usage thresholds and unthrottle the bandwidth of the mobile device.

Furthermore, the process 200 may include a user of the mobile device purchasing an updated policy from the wireless carrier. The updated policy may specify one or more increased data usage thresholds allotted by the wireless carrier for the predetermined period of time. Upon receiving the updated policy, the mobile device determines if the current amount does not exceed one or more of the increased data usage thresholds and unthrottles the bandwidth of the mobile device based on determining that the current amount does not exceed one of the increased data usage thresholds.

In some implementations, the mobile device performs the process 200 at predetermined time intervals. For example, the mobile device may perform the process 200 every ten minutes. In some implementations, the mobile device does not perform the process 200 if the mobile device determines that no data has been sent or received since the last time the process 200 was performed.

FIGS. 3, 4A-B, and 5A-B show example user interfaces for illustrating mobile device data usage. The example user interfaces display information about a data usage policy received from a wireless carrier on a mobile device. The example user interfaces may display the current amount of data used, the amount of the predetermined period of time that has passed, and allow a user to purchase an updated data usage policy from the wireless carrier.

FIG. 3 illustrates example user interfaces 300a-c that display information about a data usage policy. The user interface 300a displays a wireless and network settings menu 302 to a user. The wireless and network settings menu 302 may allow a user to select the type of networks a mobile device connects to (e.g., wireless carrier networks, Wi-Fi™, or Bluetooth™) in addition to other settings.

The wireless and network settings menu 302 include a mobile networks option 304. Selection of the mobile networks option 304 displays the user interface 300b on the mobile device. The user interface 300b includes a mobile network settings menu 306 that allows a user to view and/or modify information about data options and networks available to the mobile device.

The mobile network settings menu 306 allows a user to view information about the policy received from the wireless carrier by selecting a data usage policy option 308. The data usage policy option 308 may indicate the current amount of data used during the predetermined period of time, a data usage threshold, and information about when the predetermined period of time ends.

In some implementations, the data usage policy option 308 indicates the current bandwidth available to the mobile device. In some implementations, the data usage policy option 308 indicates if the bandwidth available to the mobile device is being throttled. In some implementations, when the policy include more than one data usage threshold, the data usage policy option 308 indicates the next threshold greater than the current amount of data used. For example, if the policy includes data usage thresholds of 125 GB and 225 GB and the current amount of data used is 200 GB, the data usage policy option 308 may indicate that bandwidth in being throttled, how the bandwidth is being throttled, and that the next threshold is 225 GB. Based on this information, a user of the mobile device may determine that the available bandwidth will be reduced again if the current amount of data used exceeds the next threshold of 225 GB.

User selection of the data usage policy option 308 displays the user interface 300c with a data usage policies menu 310 on the mobile device. The data usage policies menu 310 displays read only information to a user. For example, the data usage policies menu 310 displays information about a policy received from the wireless carrier and the current amount of data used during the predetermined period of time.

The data usage policies menu 310 includes a current data usage panel 312. The current data usage panel 312 displays representations of the current amount of data used during the predetermined period of time and representations of the one or more of the data usage thresholds. In some implementations, the current data usage panel 312 displays the amount of data used while roaming and/or connected to a local area network separately from the amount of data used while connected to the network of the wireless carrier. For example, the current data usage panel 312 may indicate that the 65 GB of data was transferred using a wide area network provided by the wireless carrier and 135 GB of data was transferred while roaming or connected to a local area network.

A time frame panel 314, included in the data usage policies menu 310, displays information about the predetermined period of time. For example, the time frame panel 314 may indicated when the predetermined period of time started, the percent of the predetermined period of time that has elapsed, and when the current amount of data usage will be reset. A user may compare the percent of the predetermined period of time that has elapsed with a percent of the data usage threshold that has been used (e.g., displayed in the current data usage panel 312) to determine if the percentages are about the same or if the user may need to purchase an updated policy with increased data usage thresholds.

A data rate policy panel 316 displays information about the current bandwidth available to the mobile device and/or the bandwidth that will be available when a data usage threshold is exceeded. For example, the data rate policy panel 316 indicates that the data rate will be 300 KB/second when the current amount of data usage exceeds 225 GB.

Selection of a learn more option 318 may display additional information about data policies on the mobile device. For example, selection of the learn more option 318 may open a web browser on the mobile device and direct the web browser to a page associated with the wireless carrier and additional information about the wireless carrier's data usage policies.

In some implementations, selection of the learn more option 318 may display a control to a user of the mobile device that allows the user to purchase an updated policy. The mobile device may determine when the user selects the control, provide information associated with the control selection to the wireless carrier, and receive an updated policy from the wireless carrier. For example, the control may display a list of policies with increased or decreased data usage thresholds and allow the user to select one of the policies. The selection of an updated policy may include selection of a duration for the updated policy. For example, the updated policy may be for the predetermined period of time or until the user of the mobile device purchases another policy.

Figure 4B:
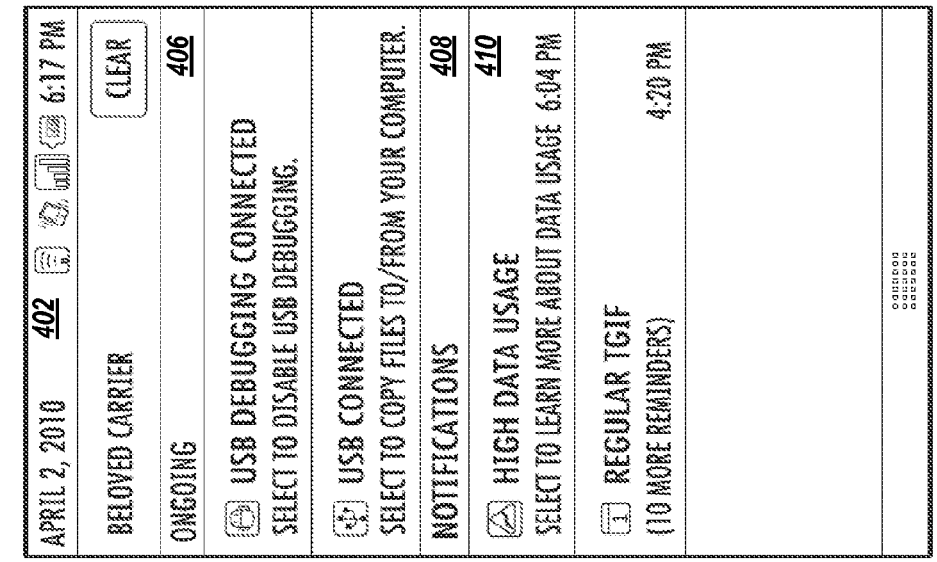
Figure 4A:
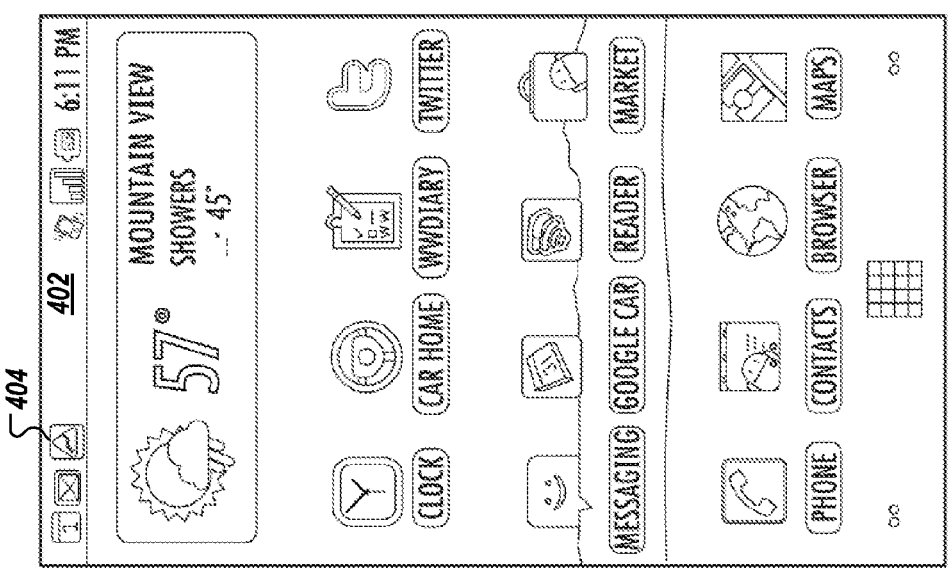

FIGS. 4A-B illustrate example user interfaces 400a-b that display information about a data usage warning notification. The user interface 400a includes a status bar 402 that displays status information about the mobile device. For example, the status bar may indicate the current time, the remaining battery life of the mobile device, networks the mobile device is connected to, and calendar and email notifications.

The status bar 402 includes a data usage warning notification 404 that indicates that the mobile device currently has high data usage. Selection of the data usage warning notification 404 may display the user interface 400b on the mobile device.

The user interface 400b includes an ongoing status panel 406 and a notifications panel 408. The ongoing status panel 406 includes information about the current status of the mobile device, such as that the mobile device is current connected to a computer.

The notifications panel 408 includes a high data usage option 410. The high data usage option 410 displays information about a data usage threshold that the mobile device may exceed, such as the date and time that the determination was made that the mobile device may exceed the data usage threshold.

Selection of the high data usage option 410 displays additional information about the current data usage and one or more data usage thresholds (e.g., the data usage threshold that the mobile device may exceed). For example, when the mobile device determines that a user selected the high data usage option 410, the mobile device may display the user interface 300c.

In some implementations, the data usage warning notification 404 is removed from the status bar 402 when the high data usage option 410 is selected. For example, when the user interface 300c is displayed by the mobile device, the mobile device does not display the data usage warning notification 404 again until the mobile device determines that another data usage threshold may be exceeded or after the predetermined period of time ends. In some implementations, when the user interface 400b is displayed on the mobile device, the data usage warning notification 404 is removed from the status bar 402.

In some implementations, the mobile device determines that the current amount is within a predetermined range of one or more of the data usage thresholds and displays the data usage warning notification 404 on the status bar 402. For example, the mobile device may determine that the current amount of data used (e.g., 200 GB) is within twenty-five percent of a data usage threshold (e.g., 225 GB) and display the data usage warning notification 404 on the mobile device.

In other implementations, when the mobile device determines that the current amount of data usage is trending to exceed one or more of the data usage thresholds within the predetermined period of time, the mobile device displays a warning in a user interface of the mobile device. The determination that a mobile device is trending to exceed a data usage threshold may take into account certain 'tolerances,' that vary over the predetermined period, i.e., to get smaller and smaller as the billing cycle or usage period elapses.

In one example, the mobile device may store data usage values that were calculated as current values, at different times during the a billing or usage period. The data usage values may be expressed as a percentage of a data usage threshold or of a maximum data usage value, or as actual data usage amounts. The mobile device may also store the associated times when the each data usage values was calculated. Using the stored data usage values, the mobile device may determine whether one or more of the data usage values suggests that a data usage threshold will be exceeded.

In one implementation, the mobile device may calculate an acceptable data usage amount that may be used per unit time without exceeding a data usage threshold, by dividing a data usage threshold by a quantity of units of time, for example, by a total number of days in a billing cycle or usage period. The result of this calculation may be multiplied by the quantity of units of time, i.e., number of days, that have elapsed since the predetermined period of time began.

The resulting value represents the maximum data usage amount that should have been used at that point in the predetermined period of time, to avoid trending over the data usage threshold. If the actual data usage amount exceeds that resulting value, the mobile device may display a notification.

Alternatively, the resulting value may be adjusted upwards or downwards by a fixed amount, i.e., 1%, 5%, 10%, or 25%, to avoid unnecessary "false positive" notifications, or to notify the user of the mobile device before the trend to exceed the data usage threshold is established. Under this approach, the mobile device may only display notifications if the actual data usage amount exceeds the resulting value by the fixed amount.

Alternatively, the resulting value may be adjusted by a variable amount, to avoid notifying users when the actual data usage amount is trending to exceed a data usage threshold during an early portion of the predetermined period of time. For instance, the mobile device may only display notifications if the actual data usage amount exceeds the resulting value by a larger amount, i.e. 15% or 25%, during the first few days of a data usage period, but may display notifications if the actual data usage amount exceeds the resulting value by a smaller amount, i.e., 0%, 1%, or 5%, during the last few days of the data usage period. Under this approach, if the actual data usage amount exceeds the resulting value by a smaller amount during the first few days of a data usage period, no notification is shown.

When the mobile device determines that the percentage of one or more of the data usage thresholds that has actually been used by the mobile device during the predetermined period of time is outside of a predetermined range from the percentage of the predetermined period of time that has elapsed, the mobile device displays a warning in a user interface. For example, the mobile device may determine that fifty percent of the predetermined period of time has elapsed and that the mobile device has used eighty-nine percent of the data specified by a data usage threshold. Based on the percent of the data usage threshold used and the percent of time elapsed, the mobile device determines that the percentage of the data usage threshold used is greater than the percentage of time elapsed by more than ten percent and displays the data usage warning notification 404 in the user interface 400a.

In some implementations, the mobile device displays the warning when the percentage of the data usage threshold used exceeds a predetermined percentage value and is outside of the predetermined range. For example, the mobile device does not display the data usage warning notification 404 until the percentage of the data usage threshold used exceeds twenty-five percent. If the mobile device determines that the percentage of the data usage threshold used is sixteen percent and the percentage of time elapsed is five percent, then the mobile device does not display the warning.

When the percentage of the data usage threshold used is greater than twenty-five percent (e.g., twenty-six percent), if the range between the percentage of the data usage threshold used and the percentage of time elapsed is outside of the predetermined range, then the mobile device displays the data usage warning notification 404 in the user interface 400a. Delaying display of the data usage warning notification 404 until the percentage of the data usage threshold used is greater than the predetermined percentage value may avoid display of premature warnings on the mobile device.

In some implementations, the mobile device does not display the warning until the percentage of time elapsed is greater than a predetermined percentage value. For example, the mobile device does not display the data usage warning notification 404 until thirty percent of the predetermined period of time has elapsed.

Figure 5B:
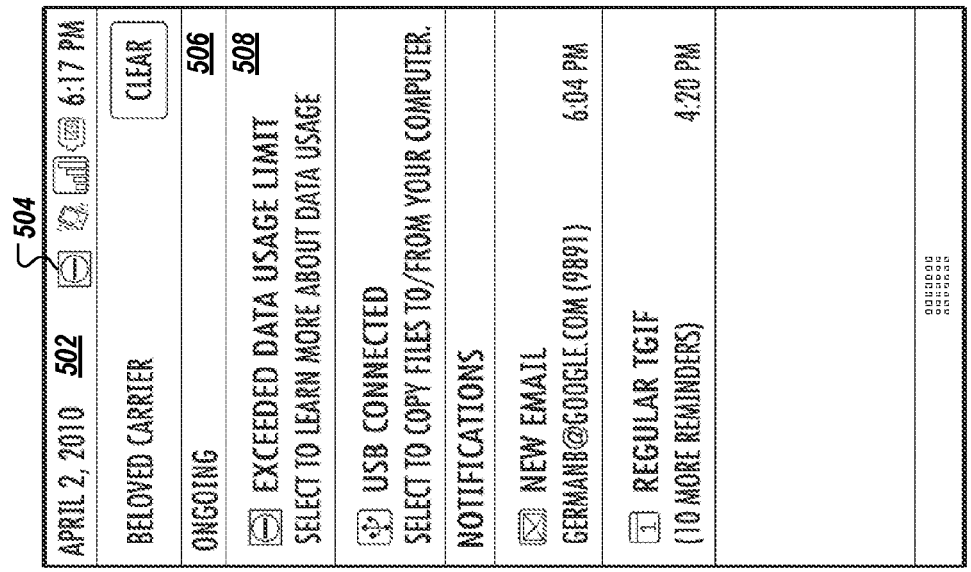
Figure 5A:
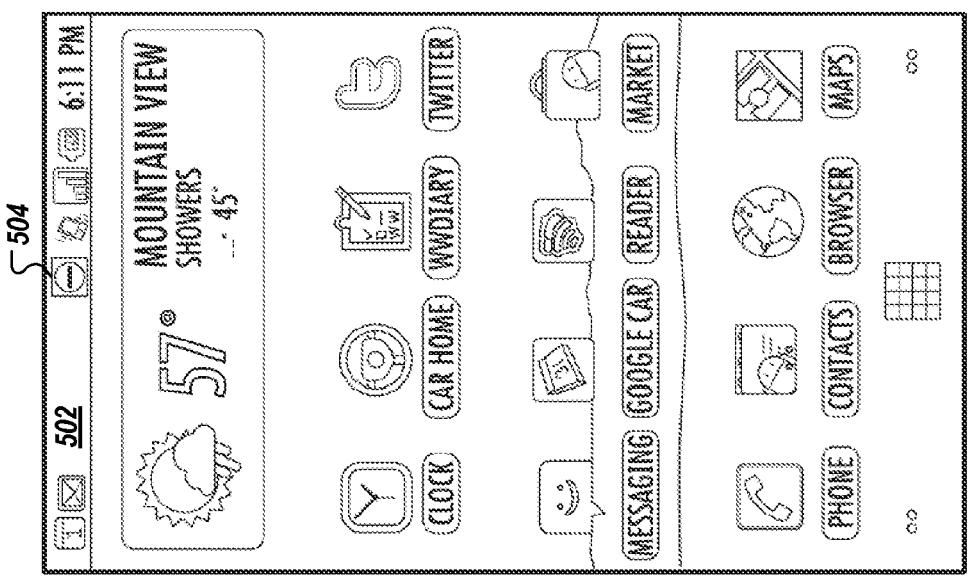

FIGS. 5A-B illustrate example user interfaces 500a-b that display information about a data usage threshold exceeded notification. In some implementations, the user interface 500a is displayed on the mobile device after the mobile device displays the user interface 400a. For example, the mobile device displays the data usage warning notification 404 before displaying a data usage threshold exceeded notification.

The user interface 500a includes a status bar 502 which displays information about the current status of the mobile device. The status bar 502 includes a data usage threshold exceeded notification 504. For example, when the mobile device determines that the current data usage is greater than one or more of data usage thresholds specified by a policy, the mobile device displays the data usage threshold exceeded notification 504.

Selection of the data usage threshold exceeded notification 504 may display the user interface 500b on the mobile device. The user interface 500b includes an ongoing status panel 506 that presents an exceeded data usage limit option 508. The exceeded data usage limit option 508 may display information about the data threshold that has been exceeded on the mobile device. In some implementations, selection of the exceeded data usage limit option 508 will display a user interface, such as the user interface 300c, with additional information about the data usage threshold that has been exceeded.

In some implementations, the data usage threshold exceeded notification 504 is displayed on the mobile device until the mobile device receives a new policy (e.g., with increased data usage thresholds) or until the predetermined period of time ends. For example, the data usage threshold exceeded notification 504 is displayed on the mobile device until a new billing cycle starts.

In some implementations, when the network the mobile device is connected to changes, the data usage threshold exceeded notification 504 is removed from the status bar 502. For example, when the mobile device connects to a local area network or begins to roam and the mobile device is no longer throttling bandwidth, the data usage threshold exceeded notification 504 is removed from the status bar 502. If the mobile device connects to the wireless carrier's wide area network again during the same predetermined period of time, the data usage threshold exceeded notification 504 is displayed in the status bar 502 again.

When the policy received by the mobile device includes more than one data usage threshold (e.g., a first and a second data usage threshold), the mobile device may throttle bandwidth based on the data usage threshold exceeded. For example, the mobile device may throttle the bandwidth to a first extent when the current amount of data usage exceeds the first data usage threshold and throttle the bandwidth to a second, different extent based on determining that the current amount of data usage exceeds the second data usage threshold.

For example, the mobile device may limit the bandwidth to fifty percent of maximum unthrottled bandwidth available to the mobile device when a lower data usage threshold (e.g., 125 GB) is exceeded, and limit the bandwidth to twenty-five percent of the maximum unthrottled bandwidth available to the mobile device when a higher data usage threshold (e.g., 225 GB) is exceeded.

In some implementations, the status bar 502 indicates how the bandwidth is being throttled. For example, if the fastest connection available to the mobile device is 4G transfer rates, when the bandwidth of the mobile device is throttled to 3G transfer rates, the mobile device may display a 3G status icon in the status bar 502. In some implementations, the data bandwidth status icon (e.g., the 3G status icon) is displayed whenever the data usage threshold exceeded notification 504 is displayed in the status bar 502.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be implemented in digital electronic circuitry, or in computer software, firmware, or hardware, including the structures disclosed in this specification and their structural equivalents, or in combinations of one or more of them. Implementations may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, processes may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Processes may be implemented in a computing system that includes a back end component, e.g., as a data server, or that includes a middleware component, e.g., an application server, or that includes a front end component, e.g., a client computer having a graphical user interface or a Web browser through which a user may interact with any implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on scope or of what may be claimed, but rather as descriptions of features specific to particular implementations. Certain features that are described in this specification in the context of separate implementations may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations have been described. Other implementations are within the scope of the following claims. For example, the steps recited in the claims may be performed in a different order and still achieve desirable results.

What is claimed is:

1. A mobile device comprising:
one or more processors; and
a computer-readable medium coupled to the one or more processors having instructions stored thereon which, if executed by the one or more processors, cause the mobile device to perform operations comprising:
receiving a policy from a wireless carrier that specifies one or more data usage thresholds allotted by the wireless carrier for data transferred over a wireless carrier network during a billing cycle;

determining an amount of data that has been transferred by the mobile device over the wireless carrier network during a particular period of time within the billing cycle;

determining that (i) the amount is trending to exceed one or more of the data usage thresholds, and (ii) the amount also exceeds a predetermined minimum warning amount, or the particular period of time exceeds a predetermined minimum period of time; and based on determining that (i) the amount is trending to exceed one or more of the data usage thresholds, and (ii) the amount also exceeds a predetermined minimum warning amount, or the particular period of time exceeds a predetermined minimum period of time, outputting a bandwidth throttling warning.

2. The mobile device of claim 1, wherein the operations further comprise:

displaying representations of the one or more data usage thresholds and the amount.

3. The mobile device of claim 1, wherein the operations further comprise:

determining that the amount is within a predetermined range of one or more of the data usage thresholds; and displaying a warning based on determining that the amount is within the predetermined range.

4. The mobile device of claim 1, wherein the operations further comprise:

determining a first value representing a percentage of one or more of the data usage thresholds that corresponds to the amount of data that has been transferred by the mobile device during the particular period of time within the billing cycle;

determining a second value representing a percentage of the billing cycle that has elapsed;

determining that the first value is outside of a predetermined range from the second value; and displaying a warning based on determining that the first value is outside of a predetermined range from the second value.

5. The mobile device of claim 4, wherein the operations further comprise:

determining that the first value exceeds a predetermined third value, wherein the warning is only displayed after determining that the first value is outside of the predetermined range from the second value, and that the first value exceeds the predetermined third value.

6. The mobile device of claim 1, wherein:

the policy comprises a Fair Access Policy for the wireless carrier; and one or more of the data usage thresholds comprises a bandwidth cap.

7. The mobile device of claim 1, wherein the operations further comprise:

detecting that the mobile device has been booted, that a subscriber identity module (SIM) card associated with the mobile device has been changed, or that a second, different particular period of time within the billing cycle has elapsed; and wherein the amount is determined based on detecting that the mobile device has been booted, that the SIM card associated with the mobile device has been changed, or that the second particular period of time within the billing cycle has elapsed.

8. The mobile device of claim 1, wherein determining the amount further comprises:

determining a first amount representing an amount of data that has been transferred by the mobile device during the particular period of time within the billing cycle while the mobile device is roaming;

determining a second amount representing an amount of data that has been transferred by the mobile device during the particular period of time within the billing cycle while the mobile device is not roaming; and establishing the second amount as the amount.

9. The mobile device of claim 1, wherein determining the amount further comprises:

determining a first amount representing an amount of data that has been transferred by the mobile device through a wide-area network connection during the particular period of time within the billing cycle;

determining a second amount representing an amount of data that has been transferred by the mobile device through a local area network data connection during the particular period of time within the billing cycle; and establishing the first amount as the amount.

10. The mobile device of claim 1, wherein the operations further comprise:

throttling the bandwidth of the mobile device over the wireless carrier network based on determining that (i) the amount is trending to exceed one or more of the data usage thresholds, and (ii) the amount also exceeds a predetermined minimum warning amount, or the particular period of time exceeds a predetermined minimum period of time.

11. The mobile device of claim 10, wherein the operations further comprise:

determining that the billing cycle has elapsed; and unthrottling the bandwidth of the mobile device over the wireless carrier network.

12. The mobile device of claim 10, where the operations further comprise:

receiving an updated policy from the wireless carrier that specifies one or more increased data usage thresholds allotted by the wireless carrier for data transferred over the wireless carrier network during the billing cycle;

determining that the amount does not exceed one or more of the increased data usage thresholds; and unthrottling the bandwidth of the mobile device over the wireless carrier network based on determining that the amount does not exceed one or more of the increased data usage thresholds.

13. The mobile device of claim 12, wherein the operations further comprise:

displaying a control that allows a user of the mobile device to purchase the updated policy; and determining that the user has selected the control, wherein the updated policy is received based on determining that the user has selected the control.

14. The mobile device of claim 10, wherein:

the one or more data usage thresholds comprise a first data usage threshold and a second data usage threshold; and throttling the bandwidth further comprises:

throttling the bandwidth to a first extent based on determining that the amount exceeds the first data usage threshold, and throttling the bandwidth to a second, different extent based on determining that the amount exceeds the second data usage threshold.

15. The mobile device of claim 10, wherein the bandwidth of the mobile device over the wireless carrier network is throttled to a non-zero rate of data transfer.

16. A computer-implemented method comprising:

receiving a policy from a wireless carrier that specifies one or more data usage thresholds allotted by the wireless carrier for data transferred over a wireless carrier network during a billing cycle;

determining an amount of data that has been transferred by the mobile device over the wireless carrier network during a particular period of time within the billing cycle;

determining that (i) the amount is trending to exceed one or more of the data usage thresholds, and (ii) the amount also exceeds a predetermined minimum warning amount, or the particular period of time exceeds a predetermined minimum period of time; and based on determining that (i) the amount is trending to exceed one or more of the data usage thresholds, and (ii) the amount also exceeds a predetermined minimum warning amount, or the particular period of time exceeds a predetermined minimum period of time, outputting a bandwidth throttling warning.

17. The method of claim 16, comprising:

displaying representations of the one or more data usage thresholds and the amount.

18. The method of claim 16, comprising:

determining that the amount is within a predetermined range of one or more of the data usage thresholds; and displaying a warning based on determining that the amount is within the predetermined range.

19. The method of claim 16, comprising:

throttling the bandwidth of the mobile device over the wireless carrier network based on determining that (i) the amount is trending to exceed one or more of the data usage thresholds, and (ii) the amount also exceeds a predetermined minimum warning amount, or the particular period of time exceeds a predetermined minimum period of time.

20. A non-transitory computer-readable medium storing software comprising instructions executable by one or more computers which, upon such execution, cause the one or more computers to perform operations comprising:

receiving a policy from a wireless carrier that specifies one or more data usage thresholds allotted by the wireless carrier for data transferred over a wireless carrier network during a billing cycle;

determining an amount of data that has been transferred by the mobile device over the wireless carrier network during a particular period of time within the billing cycle;

determining that (i) the amount is trending to exceed one or more of the data usage thresholds, and (ii) the amount also exceeds a predetermined minimum warning amount, or the particular period of time exceeds a predetermined minimum period of time; and based on determining that (i) the amount is trending to exceed one or more of the data usage thresholds, and (ii) the amount also exceeds a predetermined minimum warning amount, or the particular period of time exceeds a predetermined minimum period of time, outputting a bandwidth throttling warning.

* * * * *

UNITED STATES PATENT AND TRADEMARK OFFICE
CERTIFICATE OF CORRECTION

PATENT NO. : 8,442,484 B2
APPLICATION NO. : 13/613645
DATED : May 14, 2013
INVENTOR(S) : Andrew E. Rubin Page 1 of 1

It is certified that error appears in the above-identified patent and that said Letters Patent is hereby corrected as shown below:

Title Page, Item (75) (Inventors), line 2: please delete "Robert J. Greenwalt," and insert therefor
-- Robert J. Greenwalt III, --.

Signed and Sealed this
Twentieth Day of August, 2013

Teresa Stanek Rea
*Acting Director of the United States Patent and Trademark Office*